C. E. L. HOLMES.
CURRY-COMB.
No. 185,920.            Patented Jan. 2, 1877.
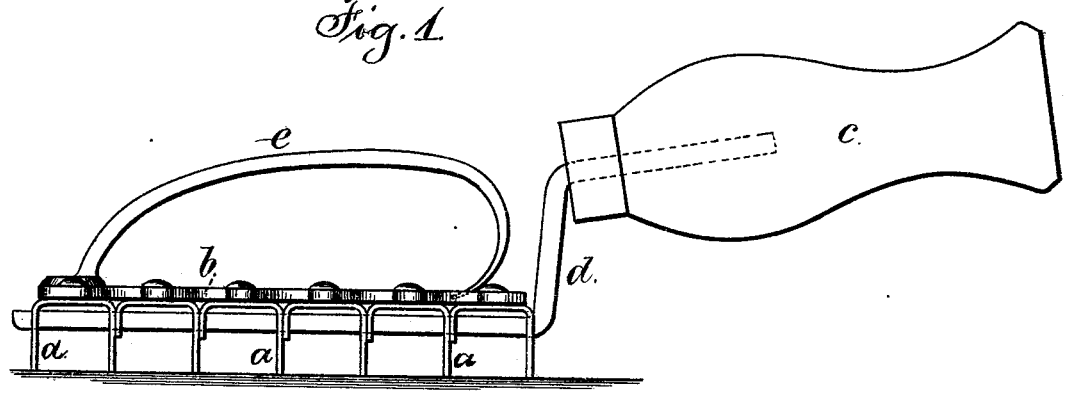
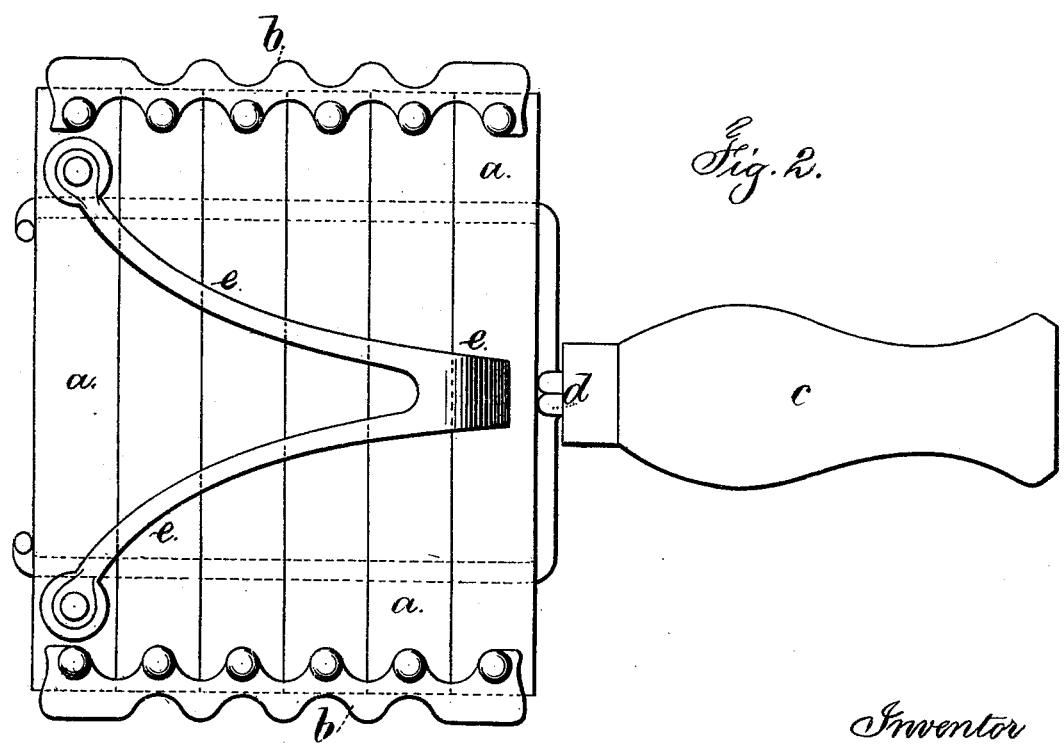
Witnesses
Chas H. Smith
Harold Serrell
Inventor
Charles E. L. Holmes
per Lemuel W. Serrell
Atty

UNITED STATES PATENT OFFICE.

CHARLES E. L. HOLMES, OF NEW YORK, N. Y.

IMPROVEMENT IN CURRY-COMBS.

Specification forming part of Letters Patent No. 185,920, dated January 2, 1877; application filed November 8, 1875.

*To all whom it may concern:*

Be it known that I, CHARLES E. L. HOLMES, of the city and State of New York, have invented an Improvement in Curry-Combs, of which the following is a specification:

Curry-combs have been made with a handle at the back; also, with a brace and grasping-piece at the back; and also with a handle projecting at one side of the comb.

My invention relates to a curry-comb, in which, by preference, the ordinary side handle is employed. I make use of an independent bifurcated handle that passes across the back of the comb-plates, and is attached at or near the front comb-plate. Said bifurcated handle may be grasped with the hand directly at the back of the comb, and independently of the ordinary handle, so that the comb can be used more conveniently than heretofore, and in positions where it is difficult to hold the handles and grasping devices before in use, and when the hand is applied to grasp the front edge of the comb, and the shank of the ordinary handle, this secondary handle becomes a rest for the palm of the hand.

In the drawing, Figure 1 is a side view of the comb, and Fig. 2 is a plan of the back of said comb.

The comb-plates $a$, knocker-plates $b$, handle $c$, and shank $d$ are of any usual character, and do not require further description. The bifurcated handle $e$ is made of metal, and may be of sheet metal cut out to shape, or of wire, or of malleable cast-iron. The same is of a shape adapted to being grasped independently of the ordinary handle $c$, and this supplemental handle is attached to the comb at or near the back of the forward comb-plate, and said handle extends across the back transversly of the comb-plates, and in line, or nearly so, with a prolongation of the ordinary handle $c$. This bifurcated handle is, by preference, curved toward the comb-plates, near the shank of the handle, and it may be attached to the comb in one or more places.

I have shown said supplemental handle as forked, and attached to the comb at the two front ends by rivets. It forms a rest for the hand to press against when the comb s grasped across the back, or the handle $e$ may be grasped according to the convenience of the person using the comb.

I claim as my invention—

1. The independent bifurcated handle $e$, at the back of the comb, attached at its two front ends to the comb, and forming also a rest, substantially as set forth.

2. In combination with a comb, having a side handle, a second independent grasping device at the back of the comb, the parts of which diverge from near the shank of the side handle, substantially as specified.

Signed by me this 5th day of November, A. D. 1875.

CHAS. E. L. HOLMES.

Witnesses:
 GEO. T. PINCKNEY,
 CHAS. H. SMITH.